United States Patent
Kasichainula et al.

(10) Patent No.: US 6,567,861 B1
(45) Date of Patent: May 20, 2003

(54) METHOD AND APPARATUS FOR REMOTELY RUNNING OBJECTS USING DATA STREAMS AND/OR COMPLEX PARAMETERS

(75) Inventors: Manoj V. S. Kasichainula, Raleigh, NC (US); Zhiyong Li, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/931,979

(22) Filed: Sep. 17, 1997

(51) Int. Cl.[7] .................................................. G06F 9/46
(52) U.S. Cl. ........................ 709/330; 709/315; 709/246
(58) Field of Search ................................. 709/330, 315, 709/231, 310, 316, 246; 717/100, 106, 108

(56) References Cited

U.S. PATENT DOCUMENTS

| | | | | |
|---|---|---|---|---|
| 5,218,713 A | * | 6/1993 | Hammer et al. ............ 395/800 |
| 5,247,676 A | * | 9/1993 | Ozur et al. ................. 395/650 |
| 5,307,490 A | * | 4/1994 | Davidson et al. ........... 395/650 |
| 5,457,797 A | * | 10/1995 | Butterworth et al. ........ 395/650 |
| 5,481,721 A | * | 1/1996 | Serlet et al. ................. 395/700 |
| 5,822,585 A | * | 10/1998 | Noble et al. ................. 395/680 |
| 5,960,087 A | * | 9/1999 | Tribble et al. ................. 380/49 |
| 6,157,960 A | * | 12/2000 | Kaminsky et al. .......... 709/303 |
| 6,173,327 B1 | * | 1/2001 | De Borst et al. ........... 709/231 |

OTHER PUBLICATIONS

S. Wray, et al, "Networked Multimedia: The Medusa Environment", IEEE, pp. 54–63, 1994.*
Implementing Remote Procedure Calls, ACM Transactions on Computer Systems 2, p. 39–59 Author: Birrell and Nelson.

* cited by examiner

Primary Examiner—Sue Lao
(74) Attorney, Agent, or Firm—Jeanine S. Ray-Yarletts; Marcia L. Doubet

(57) ABSTRACT

Proxy data stream handling and complex object parameter handling allow object oriented programs to be run as distributed programs without any explicit networking code, and without using an interface definition language (IDL). Two proxies are generated dynamically that allow method calls written for local invocation to be invoked over a network. These dynamically-generated proxies allow calls to flow across a network as if they were local, and contain support for using data stream and complex objects as parameters.

8 Claims, 7 Drawing Sheets

METHOD AND APPARATUS FOR REMOTELY RUNNING OBJECTS USING DATA STREAMS AND/OR COMPLEX PARAMETERS

FIELD OF THE INVENTION

The present invention relates generally to computer programming methods and systems, and, in particular, to object oriented programming and to methods and systems of running object oriented programs on multiple computers connected by a network.

BACKGROUND OF THE INVENTION

The distribution of a single program, so that a portion of the program executes on more than one computer, has become more pervasive as "desktop" computers have become more powerful. FIG. 1 demonstrates an example of a computer network containing several distributed computers upon which an application can execute. While most computer networks are many orders of magnitude larger, this small network is used as an example. Presently, many computer systems allow objects to communicate over a network. One method of distributing object oriented programs across computer networks is Automatic Object Distribution (AOD), described in the commonly assigned, copending patent application having Ser. No. 08/852,263, now U.S. Pat. No. 6,157,960, entitled "Technique for Programmatically Creating Distributed Object Programs".

When a distributed object-oriented program is built with AOD, it is written as if the entire system is to reside on a single machine and compiled into unlinked executable code, known as "byte code." The distribution of the objects is determined, and the AOD process is used to effect the distribution by analyzing the aforementioned byte code, determining which method calls will be made across the computer network, and generating proxy objects to represent remote objects and their method calls. Two proxies are created for each object-to-object call that will occur over the network: one that resides on the machine containing the object making the call, and one that resides on the machine containing the object to which the call is made. These two proxies cooperate to hide the fact that the objects actually reside on different machines from the programmer, thereby sparing the programmer any need to be aware of the distributed nature of the system when writing his code.

When calls are made across a computer network in this fashion, the parameters are objects. When these objects represent finite data, such as arrays, data structures, integers, etc. they are passed using well-known techniques such as Object Serialization. In Object Serialization, all the pieces of the object are combined and converted to a byte stream, which is sent across the network and then reassembled into a new data object on the other side of the network connection. This method is well-known in the art, and is used by the AOD system to send parameters for method calls which are split across the network.

However, some types of data objects do not lend themselves to Object Serialization. In particular, objects which represent data streams and complex objects (which may contain extensive programmed methods and/or references to other objects, have system locking requirements, or do not implement a serialization protocol) do not lend themselves easily to object serialization.

Objects which represent data streams are not a finite size, as they often represent data to be read from or written to some data source, such as a diskette drive. Additionally, since they may represent data being input to or output from a system or peripheral device, the data they contain may be in a system-specific format. When a program is distributed with AOD, different parts of it may be distributed to different types of computers, which may have incompatible data formats.

Additionally under the AOD proxy system, if one data stream object is split and proxied, all data streams must be so split and proxied, because the proxy remaining on the first machine would contain method names and semantics that are identical to those in a real data stream, causing name collisions. These name collisions would eliminate the possibility of any kind of data input or output operations on a machine on which a data stream proxy resides, a result which is not acceptable in today's environment. If the name collision problem were to be overcome, the performance of the proxied data stream would not be acceptable, as each read or write on a data stream so proxied would require two method calls and a remote method call.

When complex objects are passed as parameters on remote method calls, it is undesirable to pass them as simpler objects would be passed, using serialization, for three reasons:

1. A complex object will likely contain extensive code and/or references to other objects. To serialize the object, all of the data it contains and the objects it references must be serialized and passed over the network as a byte stream. This may be inefficient, especially if the object is being passed to allow access to only a small percentage of its data.

2. When a complex object is passed over the network to be used by another object, it must be locked on its "home" machine. This is to prevent any other objects from invoking it, which may result in changes to the data contained therein, while it is being operated on in a remote machine. Without such locking, the object may become corrupted. For example, if an object contains a counter, and the object is invoked on a remote machine to increment the counter and also invoked on the local machine to increment the same counter, then when the remote copy is returned and recopied over the original copy, the counter's value will be one less than required. Locking imposes a performance penalty on all objects that need to access the object being serialized, as they are all required to queue up and wait for the remote operation on the object to complete and for the results to be returned and recopied.

3. A complex object that is to be serialized must contain special code to enable such serialization. For example, in the Java™ (Java is a trademark of Sun Microsystems) environment, the object must implement the serializable interface. This may require the programmer to be aware of and code for the distributed nature of the program.

OBJECT OF THE INVENTION

It is an object of the present invention to provide a method for creating distributed object programs, which include data streams and complex objects as parameters, that allows the programmer to write a program as if it were running on a single, local machine.

It is a further object of the present invention to automatically create the distribution of data streams across multiple machines even though the format of stream data may be machine-specific.

It is yet a further object of the present invention to allow data streams that are local to a machine and those which have been distributed to other machines to co-exist without programmer input.

SUMMARY OF THE INVENTION

The present invention provides a system, method and program product for executing or running objects remotely, some of which objects may pass data streams between themselves. This is herein referred to as Proxy Datastream Handling (PDH). A data stream is an object which represents a source of data, such as a diskette drive, which is accessed to obtain data from the source. Additionally, the present invention provides a system, method and program product for executing or running objects remotely, some of which objects may pass complex objects between themselves. This is herein referred to as Complex Object Parameter Handling (COPH). A complex object is one which contains programmed member functions and/or references to other objects, or which has locking requirements to the extent that it is not desirable to pass the object itself over a network.

As shown in FIG. 2, an object oriented program may be written with many independent objects that call each other to perform a unified function. FIG. 2 depicts a computer memory 101 in which objects 102 V, W, X, Y & Z all reside. One or more of these objects may pass or receive a data stream or a complex object as a parameter. The present invention allows a user to move some of the objects from a first computer to a second computer to be executed. This is shown in FIG. 3. In FIG. 3 objects V & Y 205 remain in a first computer memory 201 while objects W, X, & Z 207 are moved to a second computer memory 203. This can be done, for instance, to balance the workload between the first computer and the second computer. This creates additional complexities since each of the program objects are capable of calling external routines herein referred to as methods. If one or more of the methods references one or more data streams as parameters, the format of the data produced therefrom may be machine-specific. Additionally, if one or more of the methods references one or more complex objects, additional complexities are introduced, e.g., the complex object may have locking requirements. For example, a complex object may be updatable by many different objects. Sending a complex object to a remote machine to make it available for an updating method requires all of the other objects that may need to update it to be locked out for the entire duration of the remote method call, thereby affecting system performance. Also, a complex object may contain extensive data fields and referenced objects which make it undesirable to pass the entire complex object over the network simply to allow a possibly minor aspect of the object to be used by the remote object.

The separation of the program objects into multiple computers for execution requires that all of the methods or objects which, due to the separation of the objects to different computer memories now access methods and data streams which are no longer coresident with the calling method on the same system, know that some of the objects and data streams are located elsewhere on the network and understand how to access those remote objects.

The Proxy Datastream Handling (PDH) and the Complex Object Parameter Handling (COPH) of the present invention eliminate the requirement that programmers write their programs with the knowledge that the objects which reference data streams or pass complex objects as parameters will be distributed over a network. It also eliminates the need for programmers to write programs in a special language, known as an Interface Definition Language (IDL), that supports distributed objects, or to write using any particular tool when it is desired to distribute the work across the network. Instead, using the present invention, programmers write programs in a common object-oriented language, such as the Java™ language, and compile the code into unlinked executable code. (In the computing literature, unlinked executable code is often called "object code". When describing object-oriented systems, the use of the term "object code" creates confusion, therefore the term "bytecodes" has been adopted for purposes of the present invention.) The programmer writes the code exactly as if writing a program that will execute on a single machine; he does not decorate the program with any additional information as he would with IDL systems. The programmer then decides where the distribution should occur, then PDH and COPH, together with Automatic Object Distribution (AOD), generate the distribution code.

The AOD performs the distribution by generating two proxies. The proxies allow method calls written for local invocation to be invoked over a network. If a split is indicated between some class Y to be executed locally, and some class X to be executed remotely, the AOD process generates the proxies to overcome the intervening network. Together, these proxies intercept the calls from Y, pass them to X, and return the result to Y. If a data stream is passed as a parameter to these calls, the present invention enhances the proxies to do the PDH necessary to obtain data from the original data stream object, send the data that the data stream object contains over the network, and reassemble it in the destination machine into a proxy data stream object that can be accessed as if it were local. This is shown in more detail in FIGS. 4A and 4B. If a complex object is passed as a parameter to these calls, the present invention enhances the proxies to do the COPH necessary to build proxies for the complex object and reference the complex object's proxies on the actual call. This is shown in more detail in FIGS. 5A and 5B.

Data Streams:

FIG. 4A represents the computer system in which a program is running in a single memory 401. Both object Y 404 and object X 403 reside on the same memory and a method call 407 is used to invoke object Y 404 from object X 403. The result of this invocation is that a reference to a data stream object is returned 417 to object X 403, and object X 403 may use the reference to access this data stream object 422 via a method call 423 to obtain the data 424 that the data stream object 422 represents.

As shown in FIG. 4B, the AOD process uses information in the bytecode file for a class, say Y 404, to generate the two proxy files (Y' 405 and Y" 406) that contain classes serving as proxies for Y 404. Y' 405 contains a class named Y that has all of the public methods in Y 404. (Note that since the original class Y 404 file will be located on the remote machine, no name conflict exists.) Y" 406 contains a class with a unique name that contains the method that makes calls to the public methods in class Y. Y' 405 resides on the same machine as X 403; Y" 406 resides on the same machine as Y 404. Since Y' 405 contains a class called Y and that class contains all of the public methods in Y 404, when X 403 makes a call against a method in the original class Y 404, that call is actually made against a method in the new class Y residing locally and contained in file Y' 405. Y' 405 passes the call information to Y" 406 which then makes a local call to Y 404. The results of the local call are propagated back to X 403 by way of Y" 406 and Y' 405. When the call returns a data stream, Y" 406 and Y' 405 cooperate to communicate the data that the data stream represents across the network and present it to the caller as if it were local data. The result is that the application, written to execute locally, can be distributed across the network without requiring that the programmer write or change any of the program code.

Complex Objects:

FIG. 5A represents a computer system in which a program is running in a single memory 501. Object Y 503, object X 502, and object Z 504 all reside on the same memory and a method call 505 is used to invoke object Y 503 from object X 502. Object Z 504 is a parameter of the method call, and as part of the method call object Y 503 performs a method call to invoke an object which is passed to object Y 503 as a parameter (in this case, object Z 504). Object Y 503 updates object Z 504 because object Z is provided to object Y 503 by object X 502 as a parameter. Object X 502 could provide itself, or any other object that contains the method that object Y 503 will use in its call. The case in which object X provides itself as a parameter, indicating that it is to be invoked by object Y, is referred to hereafter as a callback. This callback logic may be used in an object oriented system when the invocation of object Y 503 from object X 502 may cause system states which are stored in object X to be altered, or if invoking methods in the calling object is the way that the called object returns its results. The non-callback logic, in which object X 502 provides object Y 503 with a third object to be updated, such as object Z 504, may be used when object Z is a common system object for storing state information or other data that may be updated by object Y.

FIG. 5B represents the computer system of FIG. 5A after it has been distributed using the AOD process described above. Objects X 502 and Z 504 remain in computer 501, but object Y 503 has been moved to another computer 509. The AOD process knows from examining the objects' byte codes that object X 502 will be calling object Y 503, so it creates two proxies for object Y, one on computer 501 referred to as Y' 510 and one on computer 509 referred to as Y" 511. Because the AOD process also knows that object Z 504 will be passed as a parameter on the call from X 502 to Y 503, the proxies for object Y are enhanced by the present invention to create the appropriate proxies for object Z 504 so that object Z may be passed as a parameter on the remote call to object Y without needing to lock and serialize object Z. Additionally, since the logic is added by the AOD process to the proxies created for object Y, no programmer intervention is necessary to accomplish this efficient remote call using object Z, allowing the entire program to be written as if all its objects are to reside on one computer.

BRIEF DESCRIPTION OF THE DRAWINGS

The preferred embodiment of the present invention will be herein described in more detail with reference to the drawings, in which.

DETAILED DESCRIPTION OF THE PREFERRED EMBODIMENT

The present invention is applicable to any automated distributed programming utilizing proxies and data streams and using complex objects as parameters on remote calls. Proxy Datastream Handling (PDH) and complex object handling of the preferred embodiment uses the Java™ programming environment although the present invention is not limited to Java™ environments and the application of this invention to other object-oriented environments would be straightforward to one skilled in the art. The preferred embodiment of the present invention assumes that the programmer has written a program in the Java™ language as if it were to run locally (e.g., it does not include any Remote Method Invocation code), and used the standard Java™ compiler to compile the source files into corresponding bytecode files. The Automatic Object Distribution (AOD) process is used to distribute the objects and their proxies into the network, said proxies having been enhanced by the present invention to handle data streams and/or complex objects that may be parameters of one or more of the method calls to be made across the network.

Figure 1:
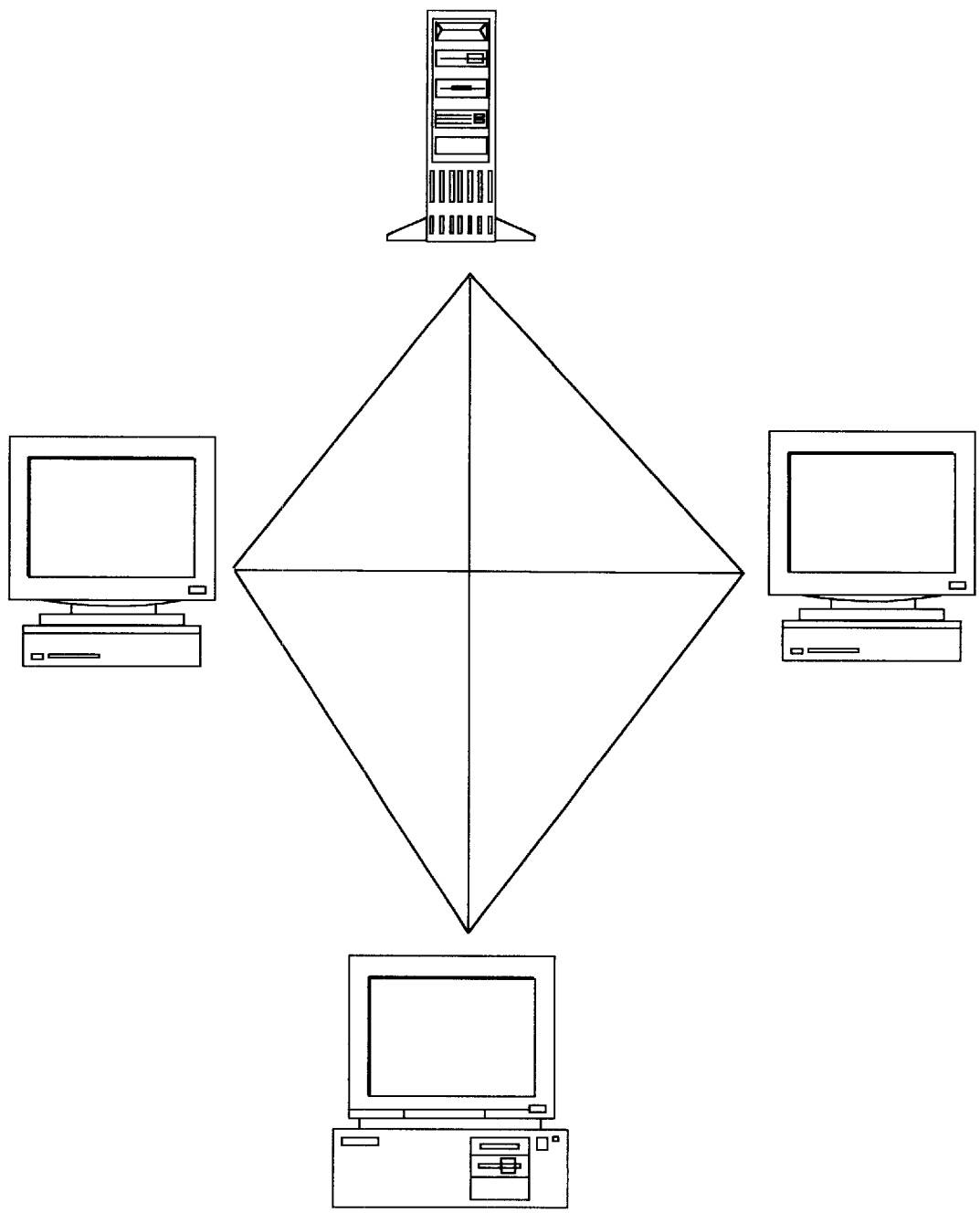
FIG. 1 depicts a sample network upon which the present invention may appear.
Figure 2:
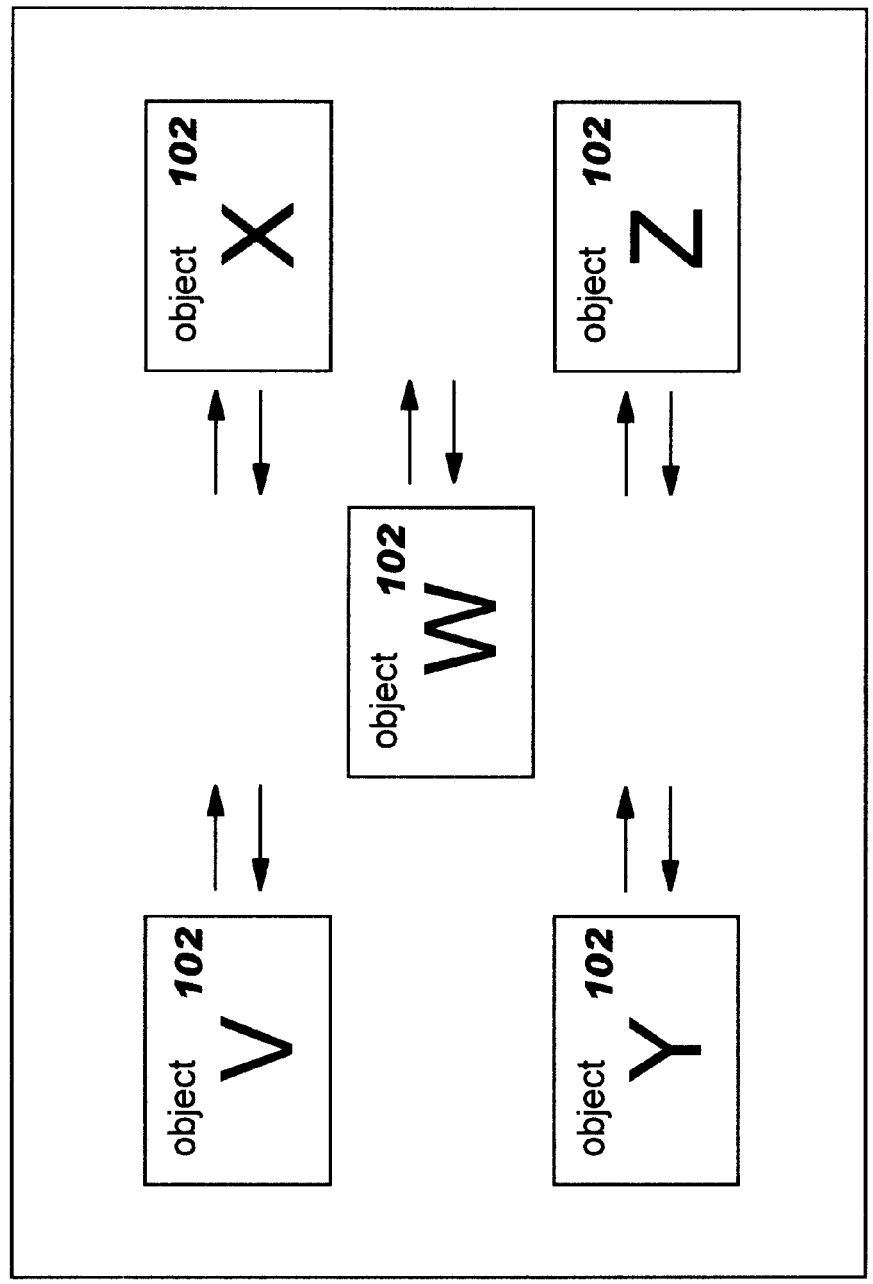
FIG. 2 depicts a computer memory containing five objects.
Figure 3:
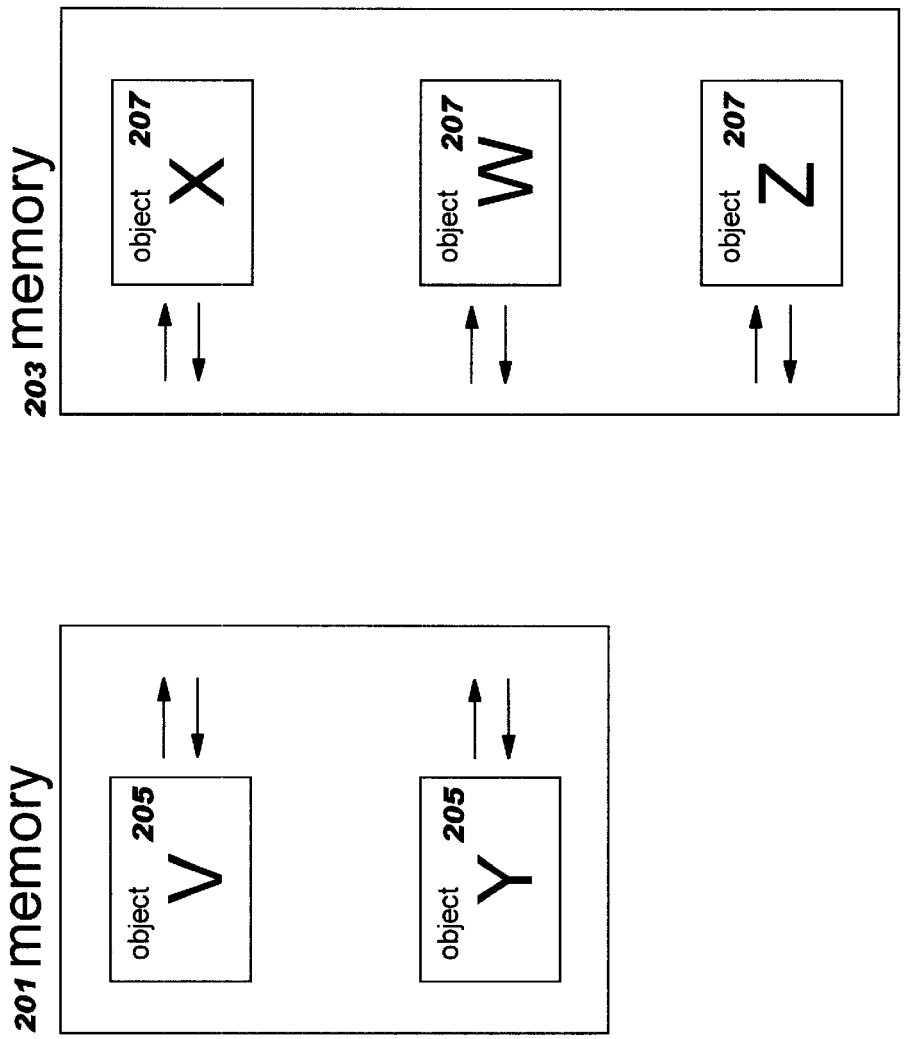
FIG. 3 depicts a distributed system upon which two objects execute in one computer memory and three objects execute in a different computer memory.
Figure 4A:
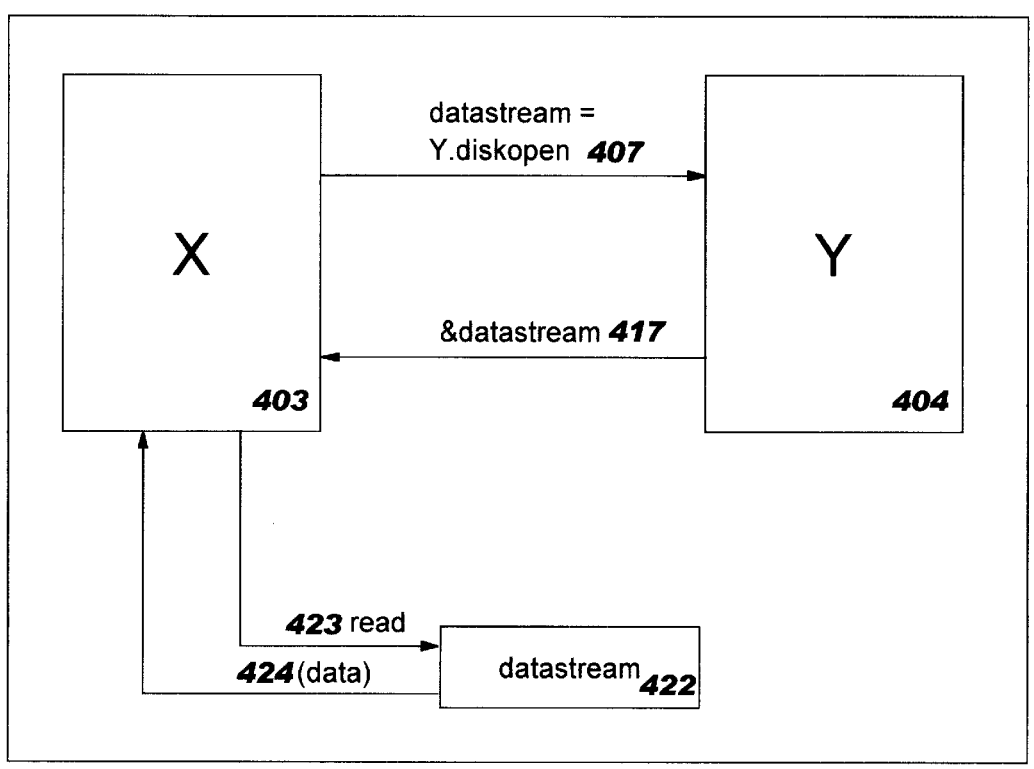
FIG. 4A depicts a method where two objects execute in the same memory, and a data stream is a returned result from a method call
Figure 4B:
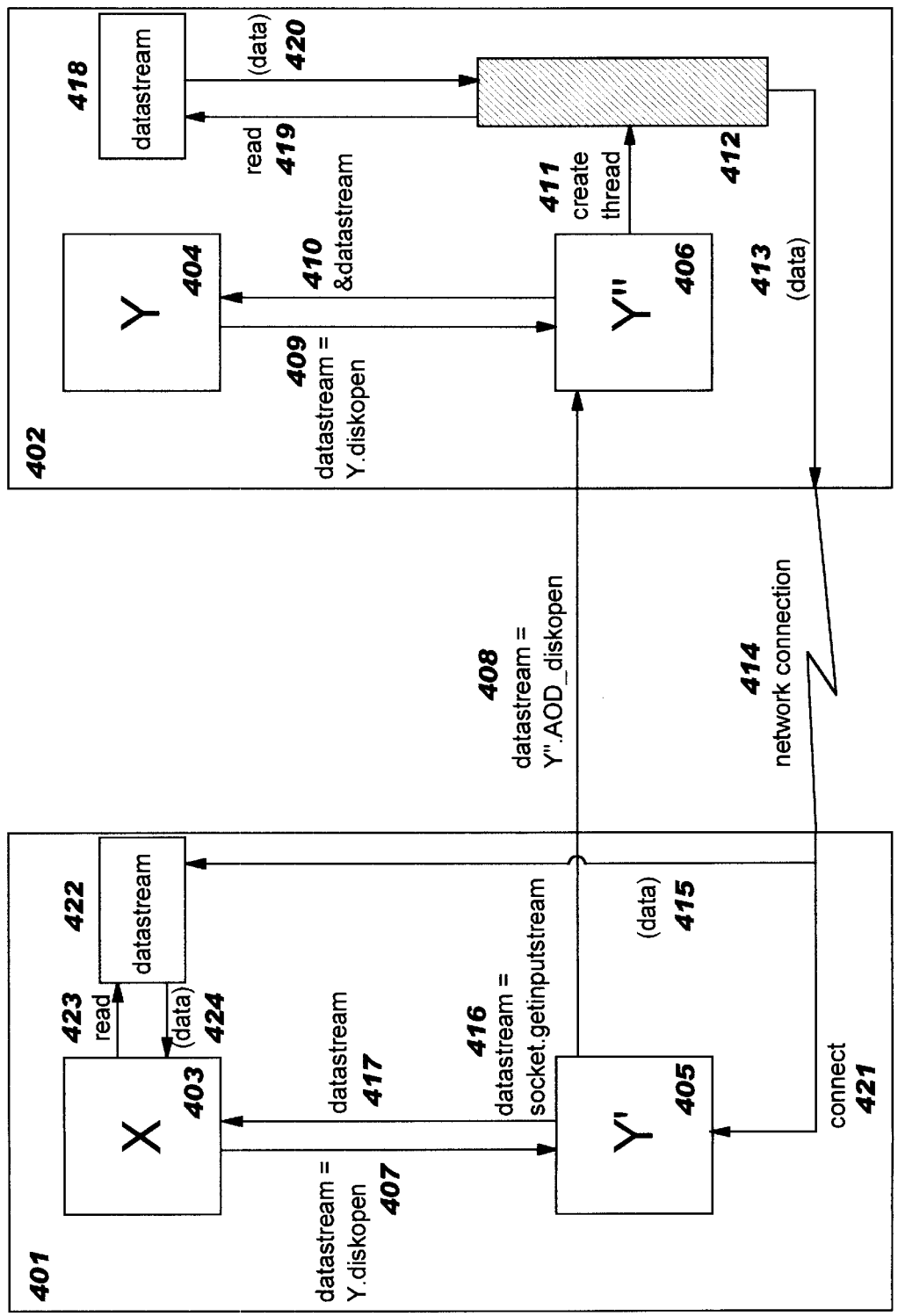
FIG. 4B depicts the objects of FIG. 4A after being distributed using AOD and the present invention.

Data Streams:

FIG. 4B depicts the system of FIG. 4A after being distributed by AOD between two computers, the client 401 and the server 402 systems. Object X 403 is a client object and object Y 404 is a server object. To allow X and Y to be automatically distributed, proxy objects are created for Y in both computers. In the client computer 401, a proxy Y' 405 is created which has the same name and method names as Y 404, so that X 403 may make calls as if Y 404 were local. Y' 405 then translates the calls to semantics of Y" 406 and calls Y" in the server computer 402.

In the server computer, a proxy Y" 406 is created which receives calls from Y' 405, translates them to the semantics that Y 404 requires and invokes the desired methods in Y 404.

When the client object X 403 is calling the server object Y 404 to obtain stream data, the proxies implement the process of the present invention.

In FIG. 4B, X 403 is shown calling a method of Y 404 to read a stream of data from an input source such as a diskette. (The input source may be any source of data that may be represented by a data stream object.) The call 407 is actually made to proxy object Y' 405, which passes the call via Remote Method Invocation (RMI) or some other standard remote calling method 408 to Y" 406. Y" then translates the call into the semantics that the actual object, Y 404, requires and then passes 409 the call to it. Y returns the result 410 in the form of a reference to a data stream object 418, which is accessed to obtain the data in the stream.

Upon receipt of the data stream object reference, Y" creates 411 a thread 412 which creates a network connection 414 with Y' 405 and then continuously reads data 419 and 420 using the data stream object and sends that data 413 out on the connection 414 to Y' as raw data (not as a data stream object). Upon creating this thread and passing the data stream to it, the method in Y" has completed its work and returns. Although in this preferred embodiment the network connection is created by the thread which Y" creates, the connection could also be created by Y'.

Upon creation 421 of the network connection 414, proxy object Y' 405 understands that the connection is for data that is to be returned via a data stream object, and builds the data stream object 422 such that when it is accessed to obtain data 423, the data 424 is read 415 from the socket connection. (In the preferred Java™ embodiment, a system call 416 may be used to build the data stream object, however other methods may be used in the preferred or other embodiments.) Y' then returns 417 this locally-created data stream object 422 to X 403. Thus X receives the requested data stream object and accesses it as if its source were local to machine 401, even though the data is actually local to machine 402 and being provided via a network connection 414.

This preferred embodiment describes the process taken when the data source resides on the server and is returned to the client. However, a similar process would be used if the data source resides on the client 401 and is being provided as a parameter to the server 402. For example, the data source could represent a keyboard on the client computer on which a user inputs requests or other data. In that case, Y' 405 would create the thread to retrieve stream data and place it on the network connection, and Y" 406 would create the data stream object to read the data from the network connection.

There are other configurations that could implement the present invention. For example, there may be more than one data stream to be passed on a call, in which case the process described above would be used for each data stream, either by creating one thread and network connection per data stream to be passed, or by passing multiple data stream objects over fewer threads and/or connections, a technique known as multiplexing. Methods for performing this multiplexing are well-known in the art, and information can be found at http://java.sun.com/products/jdk/1.1/docs/guide/rmi/spec/rmi-protocol.doc.html#3477, for example. Additionally, there may be data streams flowing in both directions on a call (i.e., both returned on the call and passed as parameters), in which case each proxy object would implement the invention in both directions, both building one or more threads to read local stream data onto one or more network connections and building one or more local data stream objects to receive data being sent over one or more network connections from the other side.

Complex Objects

Figure 5A:
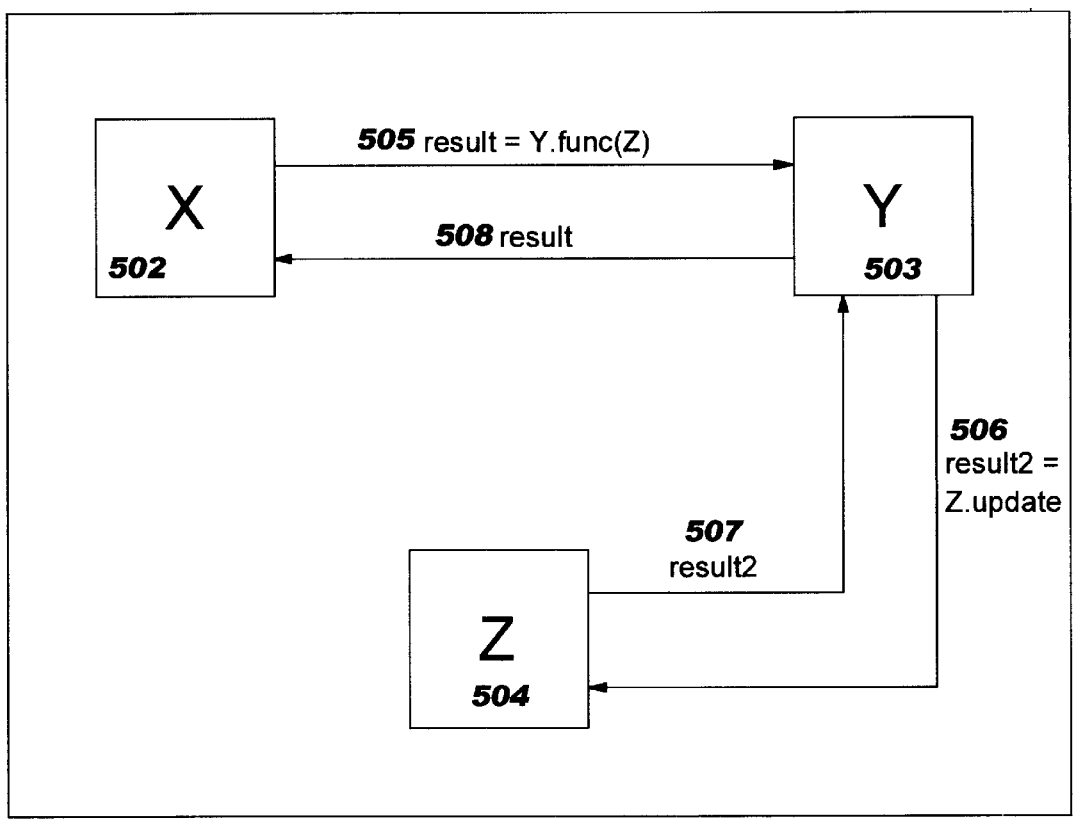
FIG. 5A depicts a method where two objects execute in the same memory, and a third object is passed as a parameter to a method call
Figure 5B:
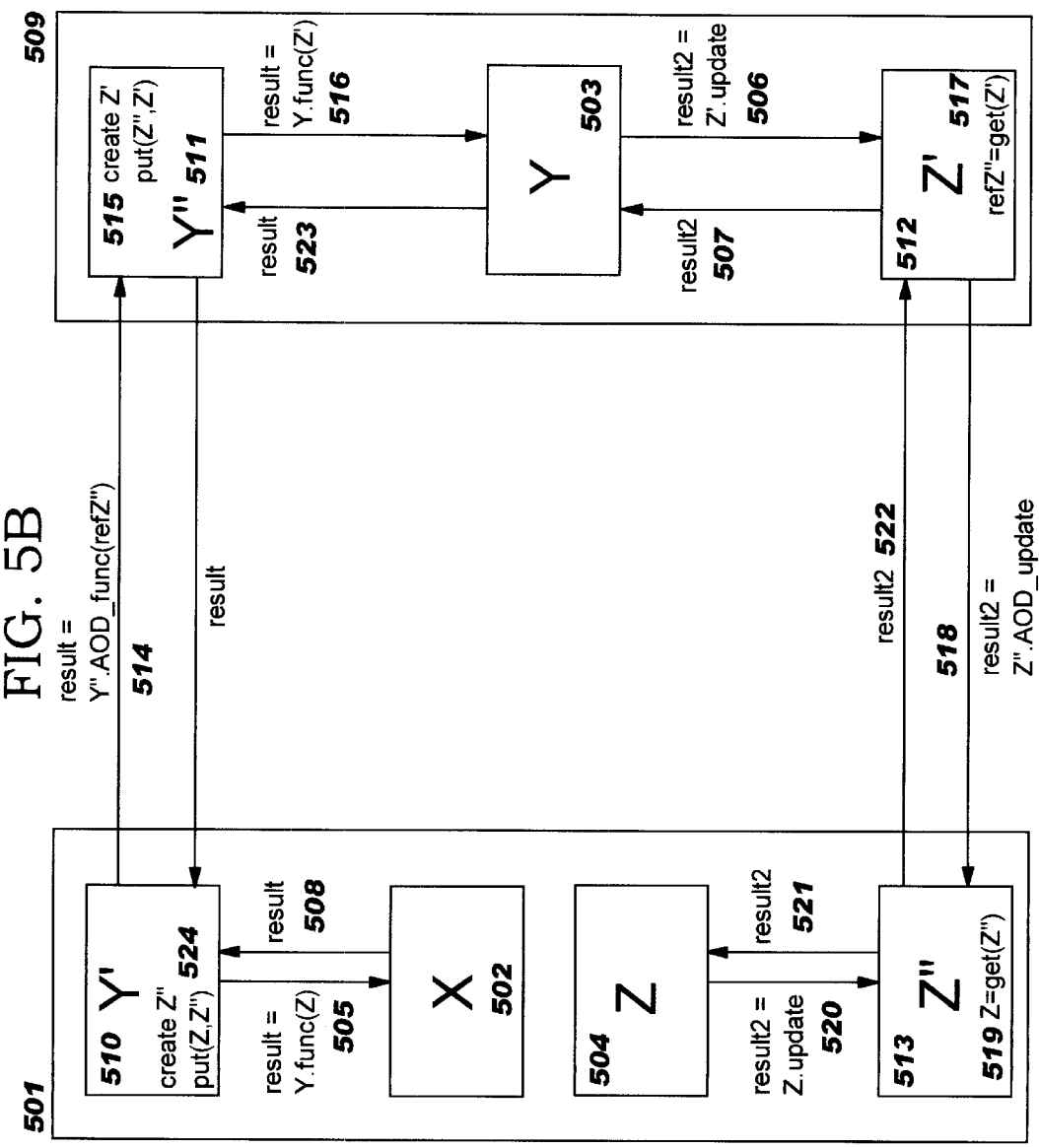
FIG. 5B depicts the objects of FIG. 5A after being distributed using AOD and the present invention.

FIG. 5B depicts the system of FIG. 5A after being distributed by AOD between two computers, the client 501 and the server 509 systems. Object X 502 is a client object and object Y 503 is a server object. To allow X and Y to be automatically distributed, proxy objects are created for Y in both computers. In the client computer 501, a proxy Y' 510 is created which has the same name and method names as Y 503, so that X 502 may make calls as if Y 503 were local. Y' 510 then translates the calls to semantics of Y" 511 and calls Y" in the server computer 509.

In the server computer, a proxy Y" 511 is created which receives calls from Y' 510, translates them to the semantics that Y 503 requires and invokes the desired methods in Y.

When a complex object, such as object Z 504, is used as a parameter on the remote method call from the client object X 502 to the server object Y 503, the proxies implement the process of the present invention.

In FIG. 5B, Object X 502 is shown making a remote method call to object Y 503, and object Z 504 is one of the parameters. The call 505 is actually made to proxy object Y' 510. Before passing the call via Remote Method Invocation (RMI) or some other standard remote calling method to Y" 511, object Y' examines the call and realizes that complex object Z 504 is one of the parameters. Without the process of the present invention, object Y' 510 would simply serialize object Z and lock it, and send it to object Y" 511. Serialization would require that all of object Z 504, including all its data and objects referenced by it, be sent over the network to object Y" 511. Serialization may be inefficient, as the amount of data to be sent over the network may be very large, particularly if object Z is a large and/or very complex object. Locking would be necessary to prevent other objects on machine 501 from making changes to object Z 504 while it is being operated on in machine 509. Without locking, object Z 504 could become corrupted. For example object Y 503 may update a counter in its copy of object Z. Before the copy of object Z is returned to machine 501, another object in machine 501 may update the same counter in the actual object Z residing on machine 501. When object Y on machine 509 completes its operation on its copy of object Z, the object must be recopied to machine 501, and after the recopy object Z's counter would be one less than the correct value. The required locking may severely degrade performance on machine 501, as objects that need to update object Z 504 would all be required to queue up, waiting for the remote call to complete before they can perform their required updates.

Using the process of the present invention, object Y' 510 creates a proxy object Z" 513 for object Z 504 before passing the call to Y" 511. This proxy contains the code necessary to allow a reference to itself to be passed over the network (for example, in the Java™ environment it implements the serializable interface). Object Y' 510 also sets up a reference table entry 524 in which the key Z" returns an indication of object Z 504. A reference table is defined as any data structure or representation into which data can be placed and retrieved using keys, for example a hash table. Then, object Y' passes the call to object Y" via Remote Method Invocation or some other standard remote calling method 514, and a reference to Z" is provided in place of Z as the parameter in the call.

Upon receiving the remote call from Y' 510, Y" 511 creates a proxy Z' 512 for object Z 504 in machine 509, and creates 515 a reference table entry in which the key Z' returns a remote call reference to the proxy Z" 513 which was created by Y' 510. Then when object Y" 511 translates the call into the semantics of object Y 503 and invokes object Y, a reference to proxy object Z' 512 is passed 516 as the parameter. Thus object Y will invoke object Z' 512 when object Y's invoked method invokes the object passed in as a parameter.

When object Z' is invoked 506 by object Y 503, object Z' uses the reference table entry which was created earlier 515 by object Y" 511 to determine where the call is to be directed. By looking itself up in the table 517, object Z' received a reference to object Z" 513 on machine 501. Using the received reference, object Z' translates the call into the semantics of object Z" and invokes object Z" using Remote Method Invocation or some other standard remote calling method 518.

When object Z" 518 is invoked, it uses the reference table entry which was created earlier 524 by object Y' to determine where the call is to be directed. By looking itself up in the table 519, object Z" receives a reference to object Z 504. Using the received reference, object Z" translates the received call into the semantics of object Z and invokes object Z. Thus, object Y 503 has successfully invoked object Z in the course of its invocation from object X 502, even though object Y resides on a different computer than objects X and Z.

Object Z 504 returns the result 521, if any, of the invocation to object Z" 513, which returns said result 522 to object Z' 512, which returns 507 said result to object Y 503. Then when object Y finishes the method which was invoked from object X 502, it returns the result 523, if any, of said invocation to object Y" 511, which returns said result to object Y' 510, which returns 508 said result to object X 502, thus completing the object X's method invocation to object Y 503, which also updated object Z 504. The proxies do all the work so that the original objects X, Y, and Z may be programmed as if they all reside on one computer.

This preferred embodiment describes the case in which the complex object is passed as a parameter on a remote call. A similar process would be employed if the complex object is returned by the remote callee to the caller. For example, the call may return a reference to a system-wide status object which actually resides on the server computer.

What is claimed is:

1. A computer implemented method for programmatically creating a distributed object program which includes data streams as parameters, wherein said programmatically created program is programmatically generated from a programmer-written program which is not specially adapted for distributed execution, the method comprising steps of:

identifying one or more objects of the programmer-written program, wherein each of said objects contains one or more programmed member functions and wherein at least one of said programmed members functions is written to pass and/or return a data stream object as a parameter;

determining a first set of the identified objects which are to reside on a first computer and a second set of the identified objects which are to reside on a second computer, wherein the first set and the second set together comprise the identified objects of the program;

determining that a first object in the first set contains logic to call a second object in the second set to obtain stream data; and programmatically generating a first proxy and a second proxy for the second object, wherein the second proxy is generated to be installed on the second computer and to include logic for obtaining the stream data from the data stream object on the second computer and for passing the stream data to the first proxy as data transmitted over a network connection, and wherein the first proxy is generated to be installed on the first computer and to include logic for building a local data stream object on the first computer and for returning the local data stream object to the first object, such that the first object can transparently obtain, at run time, data from the local data stream object, wherein the local data stream object has been built to read the data transmitted over the network connection.

2. The method as claimed in claim 1, wherein the programmatically generated first proxy further comprises logic for:

receiving a call, responsive to invocation of the logic to call the second object in the second set to obtain the stream data; and responsive to receiving said call, calling the second proxy; and wherein the programmatically generated second proxy further comprises logic for:
      causing the second proxy to call the second object to obtain the stream data, responsive to receiving the call from the first proxy; and
      receiving, from the called second object, a reference to the data stream object on the second computer.

3. The method as claimed in claim 1, wherein the logic in the programmatically generated second proxy for passing the stream data as data transmitted over a network connection transmits the data in a raw data format.

4. The method as claimed in claim 1, further comprising the steps of:

determining that a third object in the second set contains logic to call a fourth object in the first set to obtain stream data; and performing the method bidirectionally, wherein the steps of the bidirectionally-performed method operate on the third object as for the first object and on the fourth object as for the second object.

5. The method as claimed in claim 4, wherein the logic in the programmatically generated second proxy for passing the stream data as data transmitted over a network connection creates one network connection for transmitting data between the first and second objects and a separate network connection for transmitting data between the third and fourth objects.

6. The method as claimed in claim 3, wherein the logic in the programmatically generated second proxy for passing the stream data as data transmitted over a network connection creates a single network connection for transmitting data between the first and second objects and also for transmitting data between the third and fourth objects, and wherein the programmatically generated first proxy and a programmatically generated proxy for the fourth object further include logic for distributing the transmitted data upon receipt using multiplexing.

7. A computer program product for programmatically creating a distributed object program which includes data streams as parameters, wherein said programmatically created program is programmatically generated from a programmer-written program which is not specially adapted for distributed execution, the computer program product comprising:

a computer-readable storage medium having computer-readable program code means embodied in the medium, the computer-readable program code means comprising:

computer-readable program code means for identifying one or more objects of the programmer-written program, wherein each of said objects contains one or more programmed member functions and wherein at least one of said programmed members functions is written to pass and/or return a data stream object as a parameter;

computer-readable program code means for determining a first set of the identified objects which are to reside on a first computer and a second set of the identified objects which are to reside on a second computer, wherein the first set and the second set together comprise the identified objects of the program;

computer-readable program code means for determining that a first object in the first set contains logic to call a second object in the second set to obtain stream data; and computer-readable program code means for programmatically generating a first proxy and a second proxy for the second object, wherein the second proxy is generated to be installed on the second computer and to include logic for obtaining the stream data from the data stream object on the second computer and for passing the stream data to the first proxy as data transmitted over a network connection, and wherein the first proxy is generated to be installed on the first computer and to include logic for building a local data stream object on the first computer and for returning the local data stream object to the first object, such that the first object can transparently obtain, at run time, data from the local data stream object, wherein the local data stream object has been built to read the data transmitted over the network connection.

8. A computer system for programmatically creating a distributed object program which includes data streams as parameters, wherein said programmatically created program is programmatically generated from a programmer-written program which is not specially adapted for distributed execution, the system comprising:

means for identifying one or more objects of the programmer-written program, wherein each of said objects contains one or more programmed member functions and wherein at least one of said programmed members functions is written to pass and/or return a data stream object as a parameter;

means for determining a first set of the identified objects which are to reside on a first computer and a second set of the identified objects which are to reside on a second computer, wherein the first set and the second set together comprise the identified objects of the program;

means for determining that a first object in the first set contains logic to call a second object in the second set to obtain stream data; and means for programmatically generating a first proxy and a second proxy for the second object, wherein the second proxy is generated to be installed on the second computer and to include logic for obtaining the stream data from the data stream object on the second computer and for passing the stream data to the first proxy as data transmitted over a network connection, and wherein the first proxy is generated to be installed on the first computer and to include logic for building a local data stream object on the first computer and for returning the local data steam object to the first object, such that the first object can transparently obtain, at ran time, data from the local data stream object, wherein the local data stream object has been built to read the data transmitted over the network connection.

\* \* \* \* \*